United States Patent
Suzuki et al.

(10) Patent No.: US 8,704,930 B2
(45) Date of Patent: *Apr. 22, 2014

(54) IMAGE DISPLAY APPARATUS, IMAGING APPARATUS, IMAGE DISPLAY METHOD, AND PROGRAM

(71) Applicant: Sony Corporation, Tokyo (JP)

(72) Inventors: Yasufumi Suzuki, Tokyo (JP); Hisayuki Nakashima, Saitama (JP); Toru Furuwaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,602

(22) Filed: Apr. 24, 2013

(65) Prior Publication Data

US 2013/0235248 A1    Sep. 12, 2013

Related U.S. Application Data

(63) Continuation of application No. 12/601,838, filed as application No. PCT/JP2008/058659 on May 9, 2008, now Pat. No. 8,488,038.

(30) Foreign Application Priority Data

Jun. 28, 2007    (JP) ................................ 2007-171246

(51) Int. Cl.
*H04N 5/222*    (2006.01)

(52) U.S. Cl.
USPC ................. 348/333.01; 348/333.02; 345/173; 345/174; 345/175; 345/176

(58) Field of Classification Search
USPC ................. 348/333.01, 333.02; 345/173–176
See application file for complete search history.

(56) References Cited

U.S. PATENT DOCUMENTS

| | | | |
|---|---|---|---|
| 7,999,872 B2 | 8/2011 | Suzuki et al. | |
| 2004/0044957 A1 | 3/2004 | Tominaga | |
| 2004/0046887 A1 | 3/2004 | Ikehata et al. | |
| 2007/0103454 A1 | 5/2007 | Elias | |
| 2007/0132853 A1 | 6/2007 | Shiota et al. | |

(Continued)

FOREIGN PATENT DOCUMENTS

| | | |
|---|---|---|
| EP | 1 353 503 A1 | 10/2003 |
| JP | 3-189812 | 8/1991 |

(Continued)

OTHER PUBLICATIONS

Office Action issued Aug. 4, 2011 in Japanese Patent Application No. 2007-171246.

(Continued)

*Primary Examiner* — Antoinette Spinks
(74) *Attorney, Agent, or Firm* — Oblon, Spivak, McClelland, Maier & Neustadt, L.L.P.

(57) ABSTRACT

This image display apparatus includes a display unit that displays at least an image, an operation input unit that is divided into a plurality of areas, predetermined operations being assigned to the respective areas, and a control unit that displays an operation manual screen on the display unit for a predetermined time when a full-screen display process starts, that presents content of the operations assigned to the respective areas of the operation input unit by the screen, and that performs control to perform, when one of the areas is pressed, the operation assigned to the area.

10 Claims, 5 Drawing Sheets

(56) References Cited

U.S. PATENT DOCUMENTS

2009/0002512 A1 1/2009 Suzuki et al.
2009/0002516 A1 1/2009 Suzuki et al.
2009/0002540 A1 1/2009 Suzuki et al.
2009/0003817 A1 1/2009 Suzuki et al.
2009/0007020 A1 1/2009 Suzuki et al.
2009/0251423 A1 10/2009 Jung
2011/0273605 A1 11/2011 Suzuki et al.

FOREIGN PATENT DOCUMENTS

| | | |
|---|---|---|
| JP | 08-077493 | 3/1996 |
| JP | 2002-196667 | 7/2002 |
| JP | 2006-040050 | 2/2006 |

OTHER PUBLICATIONS

Office Action issued Oct. 27, 2011 in Japanese Patent Application No. 2007-171246.

IMAGE DISPLAY APPARATUS, IMAGING APPARATUS, IMAGE DISPLAY METHOD, AND PROGRAM

CROSS-REFERENCE TO RELATED APPLICATION

This application is a continuation of U.S. Ser. No. 12/601,838 filed Nov. 25, 2009, the entire content of which is incorporated herein by reference, and claims priority under 35 U.S.C. 119 International Application No. PCT/JP08/058659 filed May 9, 2008 and Japanese Patent Application No. 2007-171246 filed Jun. 28, 2007.

TECHNICAL FIELD

The present invention relates to image display apparatuses and the like that can be applied to digital still cameras, digital video cameras, and the like, particularly to an image display apparatus, an imaging apparatus, an image display method, and a program that enhance operability of reproducing a captured image.

BACKGROUND ART

Hitherto, imaging apparatuses such as digital still cameras and digital video cameras include a liquid crystal panel such as an LCD (Liquid Crystal Display). Therefore, a user can perform shooting with a desired composition by viewing a captured image (through image) displayed on the liquid crystal panel. Furthermore, on the liquid crystal panel, predetermined icons related to various settings can also be displayed in addition to a captured image.

Furthermore, there exist today imaging apparatuses including operation input means such as a touch panel. In this case, a touch panel is superimposed on a display of a liquid crystal panel, whereby a touch screen is constituted. Under such a configuration, a user can perform a predetermined operation input by tapping an icon on the touch panel.

Regarding this type of technique, for example, Patent Document 1 discloses an imaging apparatus in which a touch panel is superimposed on a display panel and in which operating various operation buttons on the touch panel causes corresponding functions to be performed.

Patent Document 1: Japanese Unexamined Patent Application Publication No. 2002-196667

DISCLOSURE OF INVENTION

However, in the related art according to the above-mentioned Patent Document 1, a zoom button is separately provided, and presses of the zoom button to the left and right cause moving to the previous screen and moving to the next screen to be performed. That is, operations of moving to the previous screen and moving to the next screen are assigned to a hard key, so that advantages of a touch panel in which respective functions are disposed on a screen are not fully taken.

The present invention is directed to realizing an easy and exact change of reproduced images by dividing a touch panel into a plurality of areas, assigning predetermined operations to the respective areas, and presenting the assignment to a user at a shift to full-screen display or the like.

According to an image display apparatus of a first aspect of the present invention, a display unit displays at least an image. A touch panel is divided into a plurality of areas, and predetermined operations are assigned to the respective areas. Also, a control unit displays a predetermined operation manual screen on the display unit for a predetermined time when a full-screen display process starts, presents content of the operations assigned to the respective areas of the touch panel by the operation manual screen, and performs control to perform, when one of the areas of the touch panel is pressed, the operation assigned to the area.

Therefore, tapping the respective areas of the touch panel causes the predetermined operations assigned to the areas to be performed on the basis of control by the control unit.

Additionally, in the first aspect, the touch panel may be divided into three areas, and the predetermined operations may include displaying a previous image assigned to a left or right area, a shift to a menu screen assigned to a central area, and displaying a next image assigned to the opposite area.

According to an imaging apparatus of a second aspect of the present invention, an imaging unit captures a subject image and obtains an image signal. A display unit displays a captured image on the basis of at least the image signal. A touch panel is divided into a plurality of areas, and predetermined operations are assigned to the respective areas. Also, a control unit displays a predetermined operation manual screen on the display unit for a predetermined time when a full-screen display process starts, presents content of the operations assigned to the respective areas of the touch panel by the operation manual screen, and performs control to perform, when one of the areas of the touch panel is pressed, the operation assigned to the area.

Therefore, in a case of reproducing and displaying a captured image, tapping the respective areas of the touch panel causes the predetermined operations assigned to the areas (e.g., moving to the next screen or moving to the previous screen related to captured images) to be performed on the basis of control by the control unit.

According to an image display method of a third aspect of the present invention, a predetermined operation manual screen is displayed on a display unit for a predetermined time when a full-screen display process starts, content of operations assigned to a plurality of respective areas of a touch panel is presented by the operation manual screen, and control is performed to perform, when one of the areas of the touch panel is pressed, the operation assigned to the area.

Therefore, the predetermined operations are performed on the basis of presses of the respective areas of the touch panel.

According to a program of a fourth aspect of the present invention, a computer performs an operation manual screen display function of displaying a predetermined operation manual screen on a display unit for a predetermined time when a full-screen display process starts, and a display changing function of presenting content of operations assigned to a plurality of respective areas of a touch panel by the operation manual screen, and changing, when one of the areas of the touch panel is pressed, display assigned to the area.

Therefore, performance of the predetermined operations based on the respective areas of the touch panel is controlled by a software process based on the program.

According to the present invention, a touch panel is divided into a plurality of areas, predetermined operations are assigned to the respective areas, and the assignment is presented to a user at a shift to full-screen display or the like, whereby an image display apparatus, an imaging apparatus, an image display method, and a program that realize an easy and exact change of reproduced images can be provided.

BEST MODES FOR CARRYING OUT THE INVENTION

Hereinafter, best modes for carrying out the present invention (hereinafter simply referred to as embodiments) will be described in detail with reference to the drawings.

A description will be given with reference to FIG. 1 that illustrates a configuration of an image display apparatus according to a first embodiment of the present invention.

Figure 1:
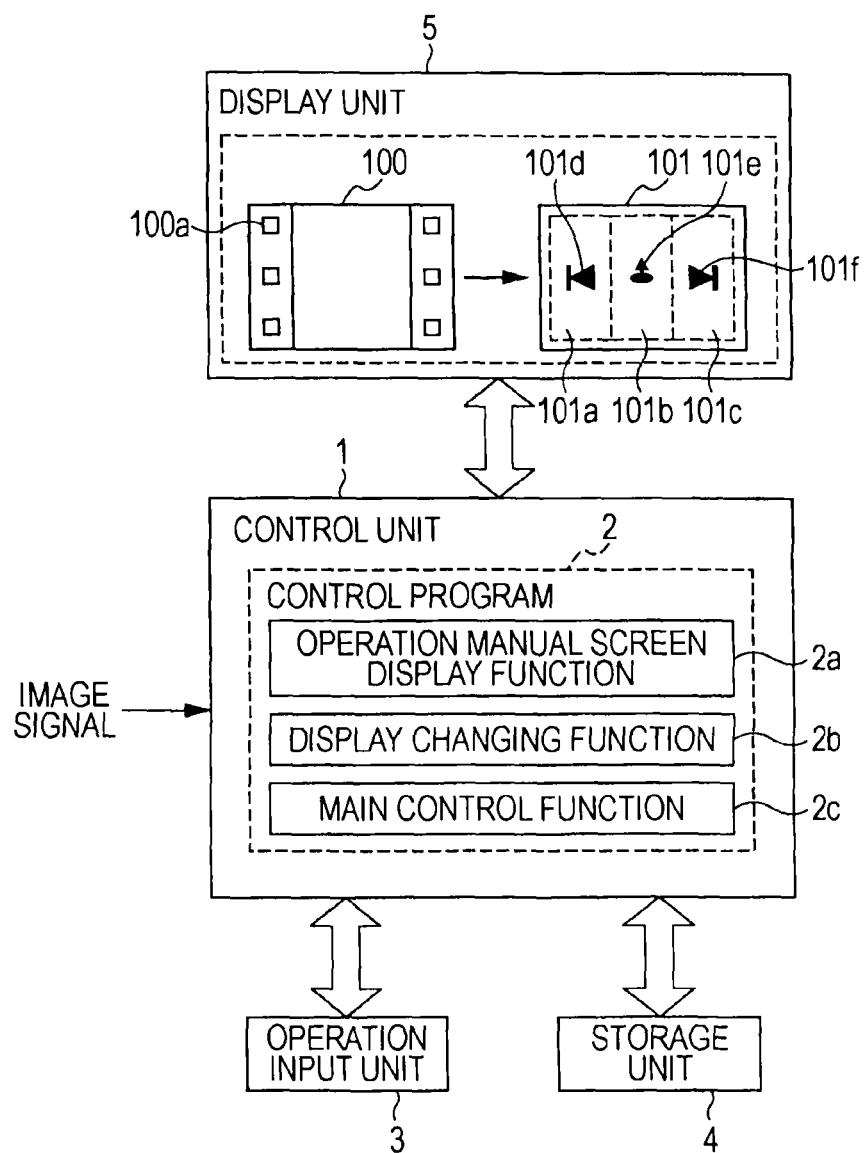
FIG. 1 is a conceptual view of an image display apparatus according to a first embodiment of the present invention.

As illustrated in FIG. 1, the image display apparatus includes a control unit 1 that controls the entire apparatus, an operation input unit 3, a storage unit 4, and a display unit 5. Also, the control unit 1 reads and executes a control program 2 stored in advance in the storage unit 4, thereby performing at least an operation manual screen display function 2a, a display changing function 2b, and a main control function 2c.

Also, the control unit 1 plays rolls of operation manual screen display means, display changing means, main control means, and the like when performing the respective functions 2a to 2c.

In such a configuration, the control unit 1 displays a predetermined operation screen 100 on the display unit 5 by using the main control function 2c. On this operation screen 100, a plurality of icons 100a to which various operations are assigned are displayed. Then, when the operation input unit 3 such as a touch panel is operated by a user so that a desired display mode is selected, the control unit 1 temporarily displays an operation manual screen 101 by using the operation manual screen display function 2a.

That is, the touch panel as the operation input unit 3 is divided into three areas in this example and predetermined operations are assigned to the respective areas. On the operation manual screen 101, too, predetermined icons 101d to 101f are displayed in the respective areas so that operation types assigned to the respective three areas 101a, 101b, and 101c of this touch panel 16 can be recognized.

Then, when the operation input unit 3 is operated by a user and when any of the areas 101a to 101c is pressed to be selected, the control unit 1 changes the display by using the display changing function 2b. More specifically, for example, moving to the previous screen is performed when the area 101a is selected, display of the operation screen 100 is performed when the area 101b is selected, and moving to the next screen is performed when the area 101c is selected. However, the present invention is not limited to this. The respective operations depend on specifications that are pre-assigned to the respective areas 101a to 101c.

As described above, the image display apparatus according to the first embodiment of the present invention is capable of performing the following characteristic processes.

A touch panel is divided into predetermined areas, and predetermined operations are assigned to the respective areas.

In a case of erasing icons, e.g., at a shift to full-screen display, an operation manual screen is temporarily displayed so that the foregoing assignment can be recognized before the shift.

Accordingly, an operation using the touch panel can be easily and appropriately performed. At a shift to a state where no icon is displayed (full-screen display for reproducing), the respective operations assigned to the touch panel can be recognized on the operation manual screen.

Next, a second embodiment of the present invention will be described.

A description will be given with reference to FIG. 2 that illustrates a configuration of an imaging apparatus according to the second embodiment of the present invention.

This is the application of the image display apparatus according to the foregoing first embodiment to an imaging apparatus such as a digital still camera and a digital video camera. Hereinafter, details are described.

Figure 2:
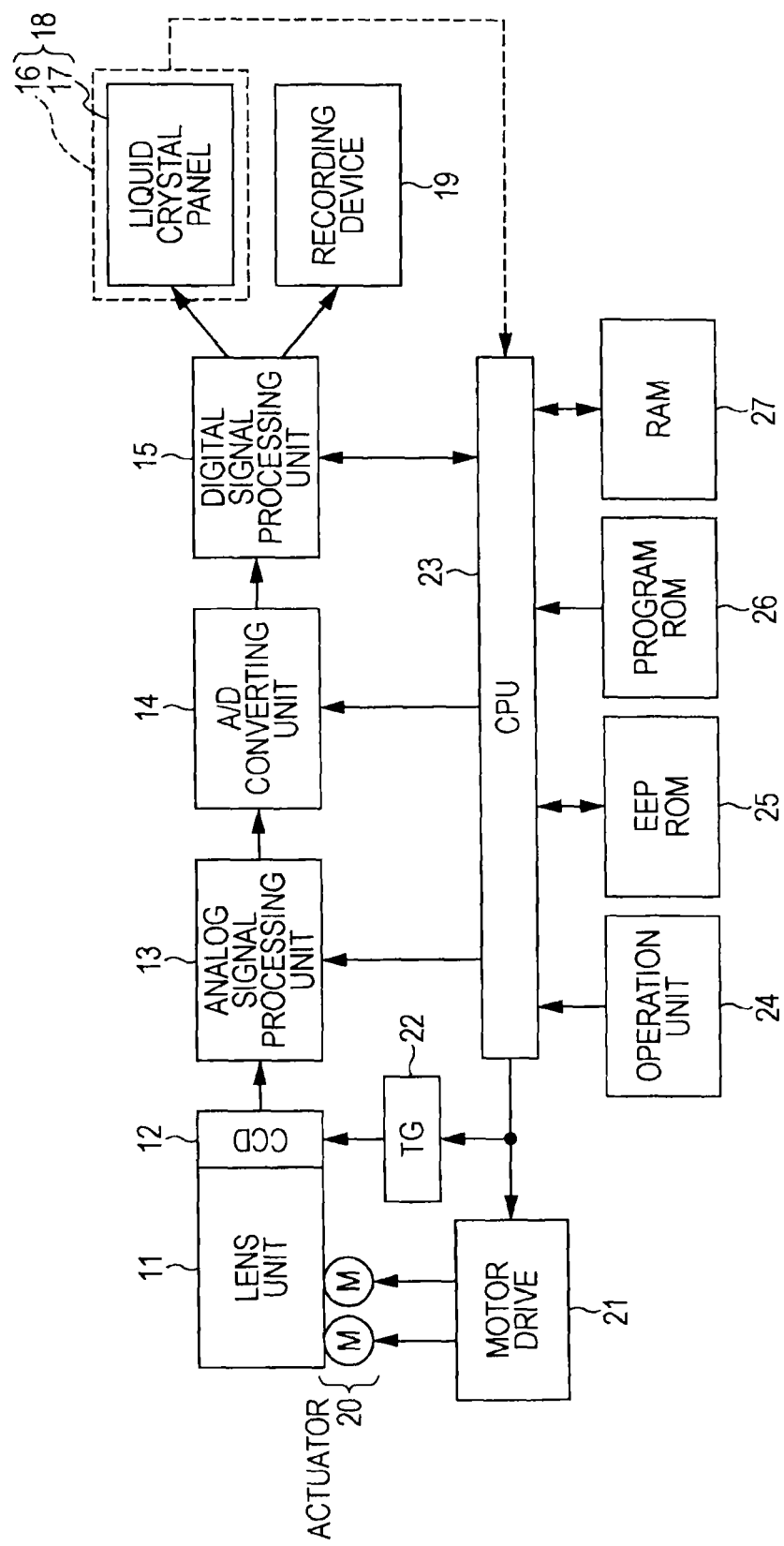
FIG. 2 illustrates a configuration of an imaging apparatus according to a second embodiment of the present invention.

As illustrated in FIG. 2, the imaging apparatus according to the first embodiment is provided with a lens unit 11 that conceptually includes an image taking lens, an aperture, a focus lens, and the like. Also, on a light path of subject light that enters through the lens unit 11, an imaging device 12 such as a CCD (Charge Coupled Device) is disposed. An output of the imaging device 12 is connected to an input of a digital signal processing unit 15 via an analog signal processing unit 13 and an analog/digital (A/D) converting unit 14. Also, an output of this digital signal processing unit 15 is electrically connected to inputs of a liquid crystal panel 17 and a recording device 19.

An actuator 20 for performing adjustment of the aperture constituting the lens unit 11 and movement of the focus lens constituting the lens unit 11 is mechanically connected to the lens unit 11. Also, the actuator 20 is connected to a motor driver 21 for performing drive control of the actuator 20.

Furthermore, this imaging apparatus is provided with a CPU (Central Processing Unit) 23 that controls the entire apparatus, and the CPU 23 is connected to the motor driver 21, a timing generator (TG) 22, an operation unit 24, an EEPROM (Electrically Erasable Programmable ROM) 25, a program ROM (Read Only Memory) 26, a RAM (Random Access Memory) 27, and a touch panel 16. Additionally, the CPU 23 functions as control means, particularly as the operation manual screen display means, the display changing means, the main control means, and the like by reading and executing a control program stored in the program ROM 26.

The touch panel 16 and the liquid crystal panel 17 constitute a touch screen 18.

The recording device 19 is a removable recording medium, for example, a disc such as a DVD (Digital Versatile Disc) or a semiconductor memory such as a memory card, and can be loaded to/removed from the main body of the imaging apparatus. The EEPROM 25 is for storing data or the like that should be held even after power-off, e.g., various pieces of set information. The program ROM 26 is for storing a program executed by the CPU 23 and data that is necessary to execute the program. Also, the RAM 27 servers as a work area when the CPU 23 executes various processes and is for temporarily storing a necessary program and data.

In such a configuration, the CPU 23 controls the respective units constituting the imaging apparatus by executing the program recorded on the program ROM 26, and executes a predetermined process in response to a signal from the touch panel 16 or a signal from the operation unit 24. The operation unit 24 is operated by a user and supplies a signal corresponding to the operation to the CPU 23.

That is, when an arbitrary position of the touch panel 16 is pressed with a finger touch or the like, that is, when a predetermined operation input is performed by a user, the coordinates of the pressed position are detected by the touch panel 16, and a signal related to the coordinates is transmitted to the CPU 23. The CPU 23 obtains predetermined information corresponding to the coordinates and executes a predetermined process on the basis of the information.

When subject light enters through the lens unit 1, the imaging device 12 captures the subject light, performs photoelectric conversion, and outputs an analog image signal. At this time, the motor driver 21 drives the actuator 20 on the basis of control by the CPU 23. With this drive, the lens unit 11 is exposed from/accommodated in a casing of the imaging apparatus. Also, with this drive, adjustment of the aperture constituting the lens unit 11 or movement of the focus lens constituting the lens unit 11 is performed.

Furthermore, the timing generator 22 supplies a timing signal to the imaging device 12 on the basis of control by the CPU 23. Exposure time and the like in the imaging device 12 is controlled by this timing signal. The imaging device 12 operates on the basis of the timing signal supplied from this timing generator 22, thereby receiving light from a subject, the light entering through the lens unit 11, performing photoelectric conversion, and supplying an analog image signal as an electric signal according to the amount of received light to the analog signal processing unit 13. The analog signal processing unit 13 performs analog signal processing (amplification or the like) on the analog image signal transmitted from the imaging device 12 on the basis of control by the CPU 23, and supplies an image signal obtained thereby to the A/D converting unit 14.

After that, the A/D converting unit 14 performs A/D conversion on the analog image signal from the analog signal processing unit 13 on the basis of control by the CPU 23 and supplies digital image data obtained thereby to the digital signal processing unit 15. The digital signal processing unit 15 performs digital signal processing, such as a noise removing process, on the digital image signal from the A/D converting unit 14 on the basis of control by the CPU 23 and supplies it to the liquid crystal panel 17, so that display is performed.

The digital signal processing unit 15 compresses the digital image signal from the A/D converting unit 14 in a JPEG (Joint Photographic Experts Group) method, for example, supplies a compressed digital image signal obtained thereby to the recording device 19, and allows the image signal to be recorded.

Furthermore, the digital signal processing unit 15 decompresses compressed image data recorded on the recording device 19 and supplies image data obtained thereby to the liquid crystal panel 17, so that display is performed. That is, the digital signal processing unit 15 supplies image data from the A/D converting unit 14 to the liquid crystal panel 17, whereby a so-called through image is displayed on the liquid crystal panel 11. In addition, the digital signal processing unit 15 generates an image of a focus frame (AF frame) used for controlling focus on the basis of control by the CPU 23, supplies the image to the liquid crystal panel 17, and allows the image to be displayed.

After that, when a user presses a shutter button that is conceptually included in the operation unit 24, a release signal is supplied from the operation unit 24 to the CPU 23. When the release signal is supplied to the CPU 23 in this way, the CPU 23 controls the digital signal processing unit 15 to allow image data supplied from the A/D converting unit 14 to the digital signal processing unit 15 to be compressed, and allows the recording device 19 to record the compressed image data.

This imaging apparatus has an AF function. In the imaging apparatus according to this embodiment, an AF frame is set on an image captured by the imaging device 12, and focus is controlled on the basis of an image inside the AF frame. In this AF function, the AF frame can be set at an arbitrary position on an image displayed on the liquid crystal panel 17, and furthermore, the position, size, and the like can be controlled only by operating the touch panel 16 that is configured integrally with the liquid crystal panel 17. An AF process is realized when the CPU 23 reads and executes a program in the program ROM 26.

The points that are particularly characteristic here are as follows. That is, the CPU 23 displays a predetermined operation screen on the liquid crystal panel 17. Then, when the touch panel 16 is operated by a user and a desired display mode is selected, the CPU 23 temporarily displays the operation manual screen.

That is, the touch panel 16 is divided into three areas and predetermined operations are assigned to the respective areas. On the operation manual screen, too, predetermined icons are displayed in the respective areas so that the operation types assigned to the three areas of the touch panel 16 can be recognized.

In this way, when any of the areas of the touch panel 16 is tapped and selected by a user, the CPU 23 changes the display.

As described above, in the imaging apparatus according to the second embodiment of the present invention, the touch panel 16 is divided into predetermined areas, and predetermined operations are assigned to the respective areas. In a case of erasing icons, such as at a shift to full-screen display, a characteristic process of temporarily displaying the operation manual screen so that the assignment can be recognized before the shift can be performed. Accordingly, an operation using the touch panel 16 can be easily and appropriately performed, and the respective operations assigned to the touch panel 16 can be recognized on the operation manual screen at a shift to a state where no icon is displayed.

Next, a description will be given with reference to FIGS. 3A and 3B that illustrate schematic views of the imaging apparatus according to the second embodiment of the present invention.

Figure 3A:
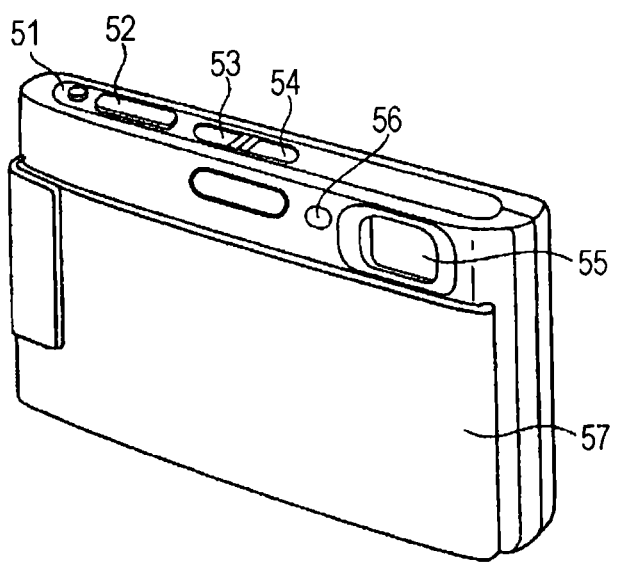
FIG. 3A is a back perspective view of the imaging apparatus according to the second embodiment of the present invention.
Figure 3B:
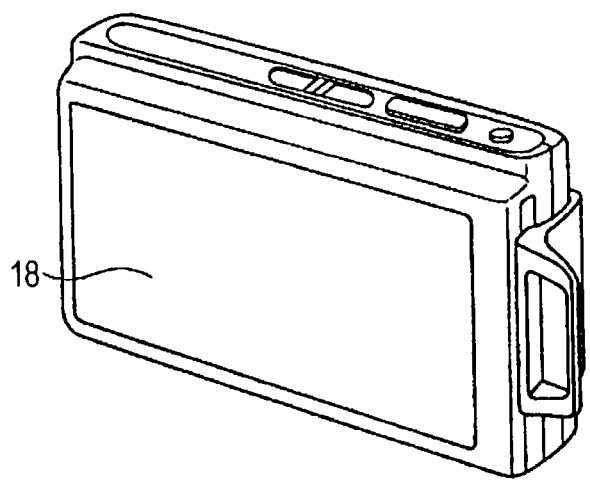
FIG. 3B is a front perspective view of the imaging apparatus according to the second embodiment of the present invention.

FIG. 3A is a back perspective view of the imaging apparatus, whereas FIG. 3B is a front perspective view.

A front surface of the imaging apparatus is covered with a lens cover and has an arrangement in which an image taking lens 55 and an AF illuminator 56 conceptually included in the lens unit 11 are exposed when the lens cover 57 on the front surface is opened downward. This AF illuminator 56 also serves as a self-timer lamp. On a top surface of the imaging apparatus, a zoom lever (TELE/WIDE) 51, a shutter button 52, a reproducing button 53, and a power button 54 are disposed. Furthermore, the touch screen 18 is provided on a back surface of the imaging apparatus. The zoom lever 51, the shutter button 52, the reproducing button 53, and the power button 54 are conceptually included in the operation unit 24.

Figure 4:
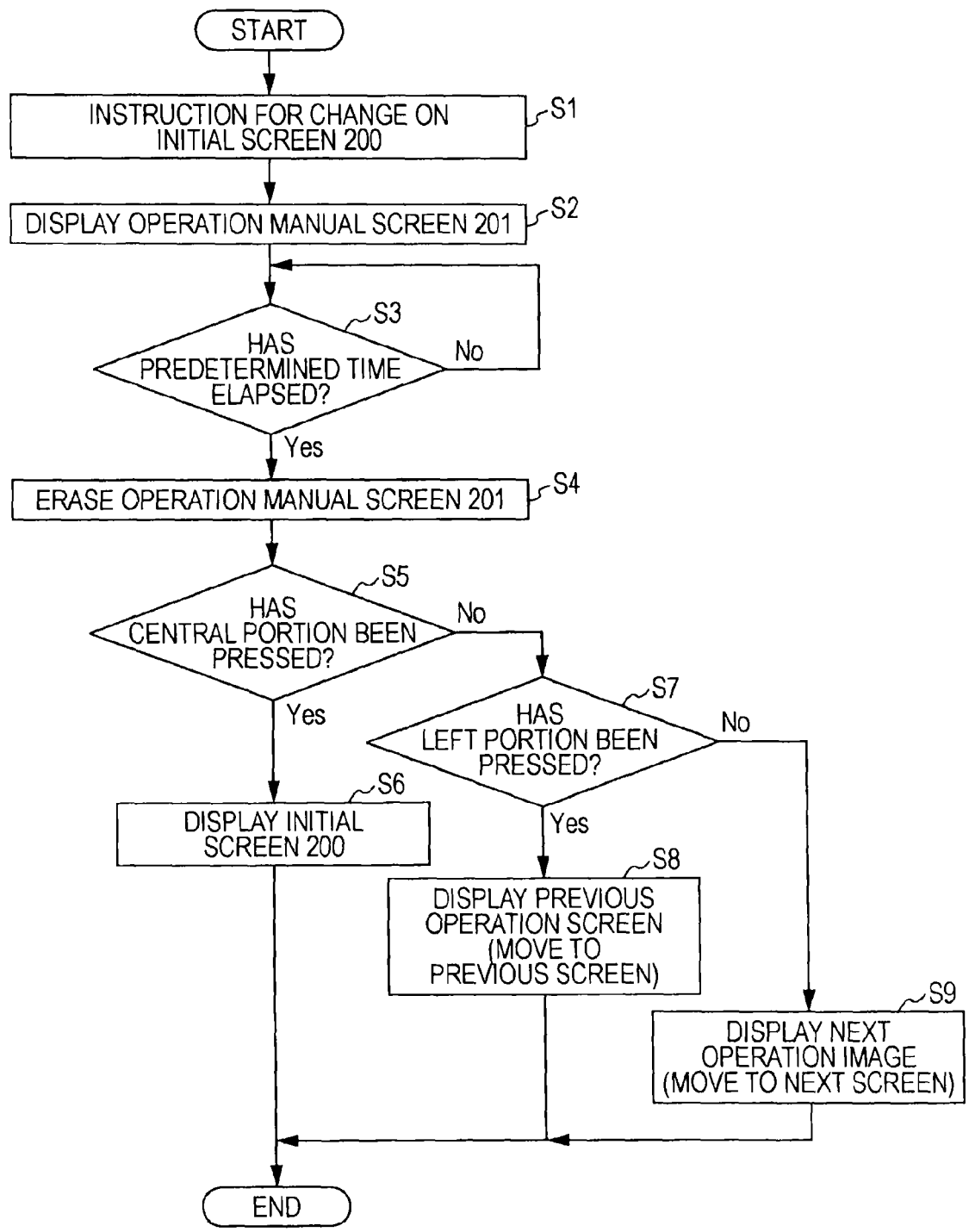
FIG. 4 is a flowchart explaining in detail a characteristic process by the imaging apparatus according to the second embodiment of the present invention.

Hereinafter, a characteristic process performed by the imaging apparatus according to the second embodiment of the present invention will be described in detail with reference to the flowchart in FIG. 4. Note that the following series of processes also correspond to an image display method according to the second embodiment.

Figure 5:
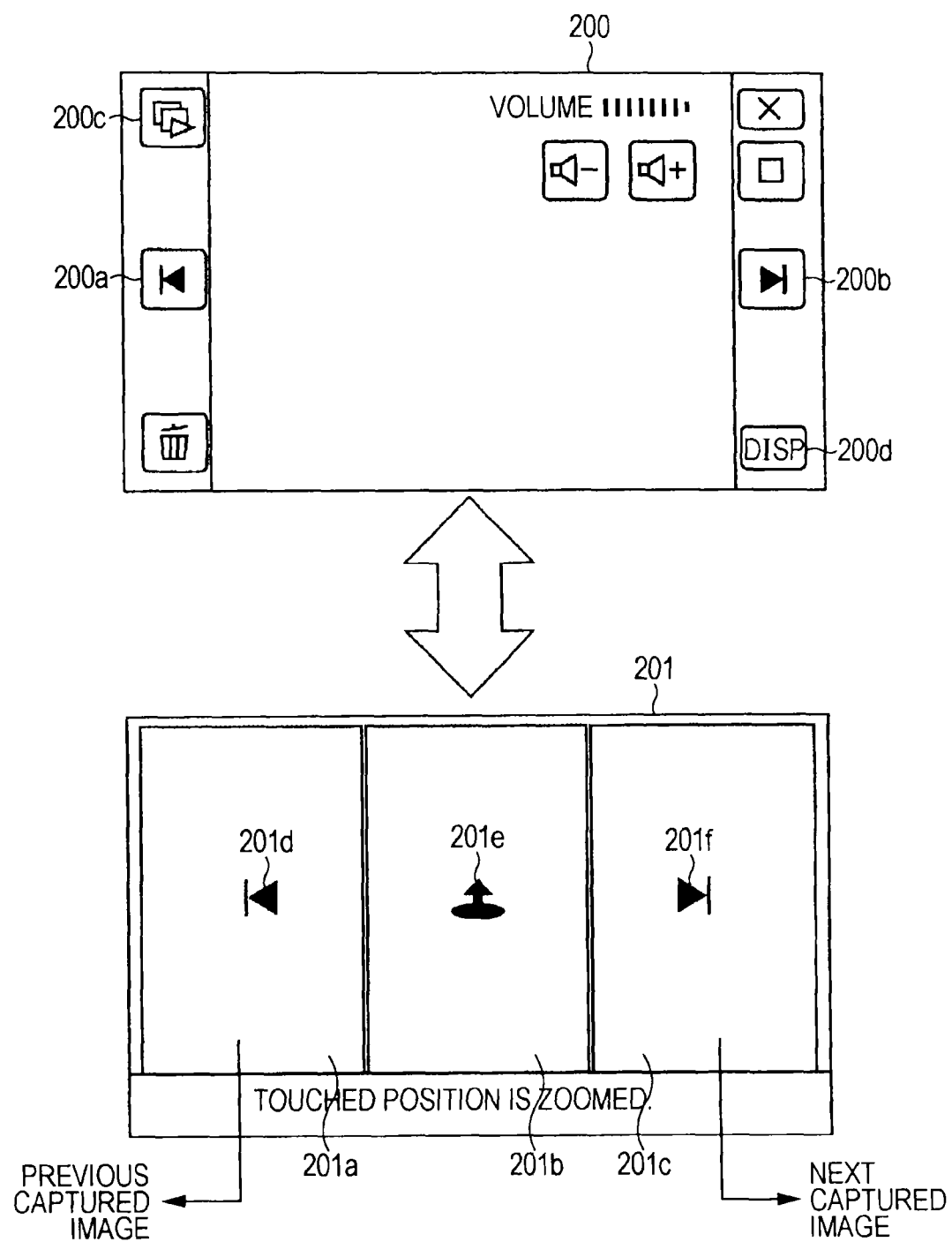
FIG. 5 illustrates a shift of a screen in the imaging apparatus according to the second embodiment of the present invention.

In the following, FIG. 5 is referred to as necessary. As illustrated in FIG. 5(a), in an initial screen 200, a move-toprevious-screen button 200*a*, a move-to-next-screen button 200*b*, a slideshow reproducing button 200*c*, and a screen change button 200*d* are displayed, for example.

Then, in the initial screen 200, when an instruction to change screens is provided through tapping of the screen change button 200*d*, causing a shift to full-screen reproducing (step S1), the CPU 23 first displays an operation manual screen 201 (step S2), continues the display until predetermined time has elapsed (step S3), and erases the operation manual screen 201 (step S4) after the predetermined time has elapsed (branch to YES in step S3). That is, full-screen display for reproducing is performed.

According to the foregoing process, the operations assigned to the respective areas of the touch panel 16 can be recognized before a shift to full-screen reproducing in which no icon is displayed. That is, the user can recognize the operations assigned to respective areas 201*a* to 201*c* of the touch panel 16 on the basis of icons 201*d* to 201*f* displayed in the respective areas 201*a* to 201*c*.

Then, the CPU 23 determines whether the central area 201*b* of the touch panel 16 has been tapped (step S5), displays the initial screen 200 (step S6) when determining that the central area 201*b* has been tapped (branch to YES in step S5), and ends the process.

On the other hand, if the CPU 23 determines in step S5 that the central area 201*a* has not been tapped (branch to NO in step S5), the CPU 23 determines whether the left area 201*a* has been tapped (step S7). If the CPU 23 determines that the left area 201*a* has been tapped (branch to YES in step S7), the CPU 23 displays a screen related to the previous captured image (move to previous screen) (step S8) and ends the process. On the other hand, if the CPU 23 determines that the left area 201*a* has not been tapped (branch to NO in step S7), the CPU 23 determines that the right area 201*c* has been tapped, displays a screen related to the next captured image (move to next screen) (step S9), and the series of processes end.

As described above, according to the first and second embodiments of the present invention, an operation using a touch panel can be easily and appropriately performed. Particularly, at a shift to a state where no icon is displayed (e.g., full-screen display of a captured image), respective operations assigned to the touch panel can be recognized on the operation manual screen.

The first and second embodiments of the present invention have been described above, but the present invention is not limited to those embodiments, and various improvements or modifications can be accepted without deviating from the scope of the invention.

For example, in the foregoing first and second embodiments, descriptions have been given about a screen for explaining respective functions assigned to three areas of the touch panel as an example of the operation manual screen. However, the present invention is not limited to this, and a simple operation manual may also be displayed in addition to the icons.

The invention claimed is:

1. An image display apparatus comprising:
a display configured to display at least an image;
a touch panel that is divided into a plurality of areas, a predetermined operation being assigned to each of the respective areas; and
a control circuit configured to:
  display a predetermined operation manual screen on the display only for a predetermined time when a full-screen display process starts,
  present symbols of the predetermined operation manual screen, the symbols representing the predetermined operations assigned to the respective areas of the touch panel by the predetermined operation manual screen only for the predetermined time,
  erase the predetermined operation manual screen including the symbols, after the predetermined time has elapsed, from the display,
  perform the operation assigned to the area when one of the plurality of areas of the touch panel is pressed, after the predetermined time when the operation manual screen including the symbols are erased,
wherein
the plurality of areas into which the touch panel displaying an image during the full-screen display process is divided includes a left area, a central area and a right area,
the predetermined operations include displaying a previous image assigned to the left or the right area, a shift to a menu screen assigned to the central area, and displaying a next image assigned to the opposite area, and
the control circuit presents a respective one of the symbols in each of the left, central, and right areas.

2. The image display apparatus according to claim 1, further comprising:
an imager configured to capture a subject image and obtain an image signal,
wherein
the display is configured to display a captured image on the basis of at least the image signal.

3. The image display apparatus according to claim 1, further comprising a memory configured to store a plurality of images including the image, wherein the display is configured to display the plurality of images stored in the memory.

4. The image display apparatus according to claim 2, wherein the predetermined operations further include capturing the subject image, and
the control circuit is further configured to control the imager to capture the subject image when the touch panel is pressed in an area corresponding to capturing the subject image.

5. An image display method implemented in an image display apparatus, comprising:
displaying, by the image display apparatus, a predetermined operation manual screen on a display only for a predetermined time when a full-screen display process starts;
presenting, only for the predetermined time, symbols of the predetermined operation manual screen, the symbols representing predetermined operations assigned to each of a plurality of areas, an area of a touch panel displaying an image during the full-screen display process being divided into the plurality of areas, which include a left area, a central area and a right area, the predetermined operations including displaying a previous image assigned to the left or the right area, a shift to a menu screen assigned to the central area, and displaying a next image assigned to the opposite area;
erasing the predetermined operation manual screen including the symbols, after the predetermined time has elapsed; and
performing the operation assigned to the area when one of the plurality of areas of the touch panel is pressed, after the predetermined time when the predetermined operation manual screen including the symbols are erased.

6. The image display method of claim 5, wherein the image display apparatus includes an imager configured to capture a subject image and obtain an image signal, and the method further includes capturing the subject image when the touch panel is pressed in an area corresponding to capturing the subject image.

7. The image display method of claim 6, wherein the method further comprises displaying the captured image on the basis of at least the image signal.

8. A non-transitory computer readable storage medium on which is stored a program for causing an image display apparatus to perform:
 displaying a predetermined operation manual screen on a display only for a predetermined time when a full-screen display process starts;
 presenting, only for the predetermined time, symbols of the predetermined operation manual screen, the symbols representing predetermined operations assigned to each of a plurality of areas, an area of a touch panel displaying an image during the full-screen display process being divided into the plurality of areas, which include a left area, a central area and a right area, the predetermined operations including displaying a previous image assigned to the left or the right area, a shift to a menu screen assigned to the central area, and displaying a next image assigned to the opposite area;
 erasing the predetermined operation manual screen including the symbols, after the predetermined time has elapsed; and
 performing the operation assigned to the area when one of the plurality of areas of the touch panel is pressed, after the predetermined time when the predetermined operation manual screen including the symbols are erased.

9. The non-transitory computer readable storage medium of claim 8,
 wherein the image display apparatus includes an imager configured to capture a subject image and obtain an image signal, and
 the program is further configured to cause the image display apparatus to capture the subject image when the touch panel is pressed in an area corresponding to capturing the subject image.

10. The non-transitory computer readable storage medium of claim 9, wherein the program is further configured to cause the image display apparatus to display the captured image on the basis of at least the image signal.

* * * * *